Jan. 2, 1945.  R. T. POUNDS  2,366,286
ELECTRICAL DAMPING APPARATUS FOR WEIGHING SCALES
Filed July 16, 1941  2 Sheets-Sheet 1
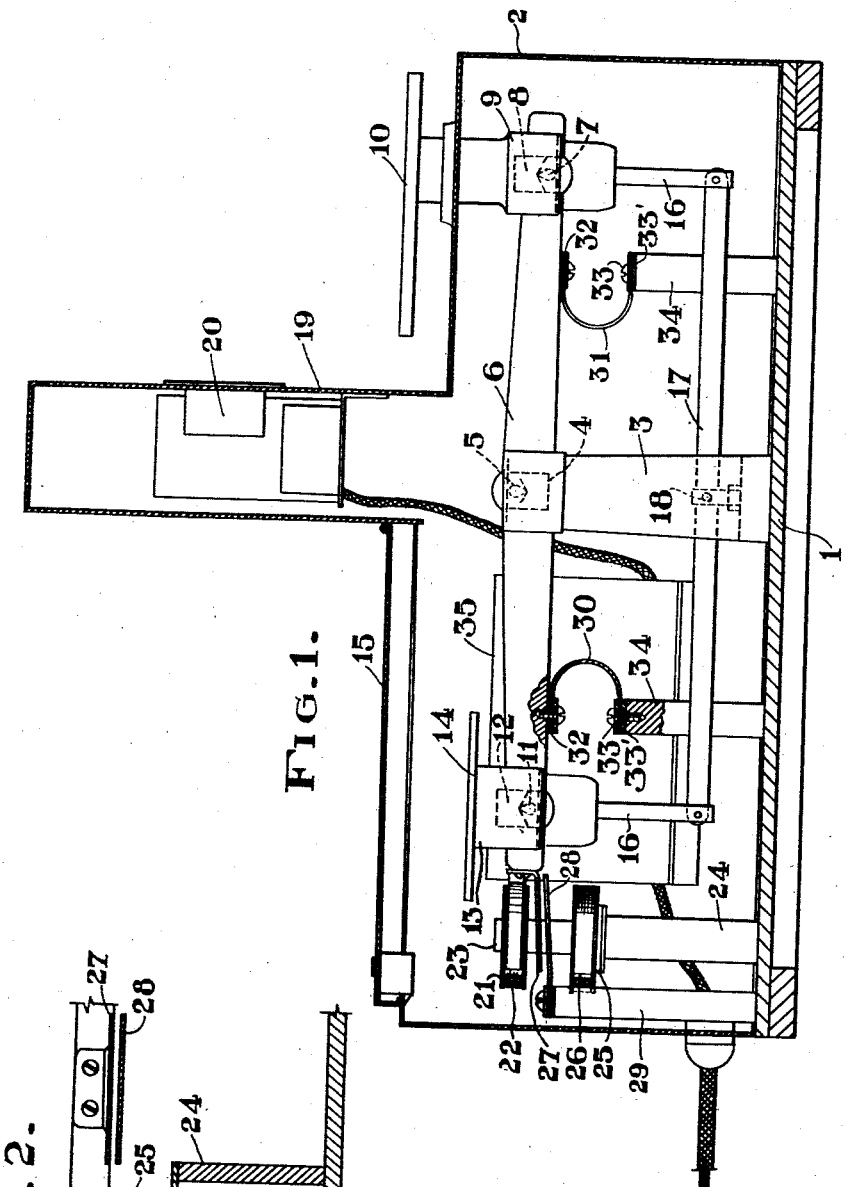
Inventor
RICHARD T. POUNDS
By W. S. McDowell
Attorney

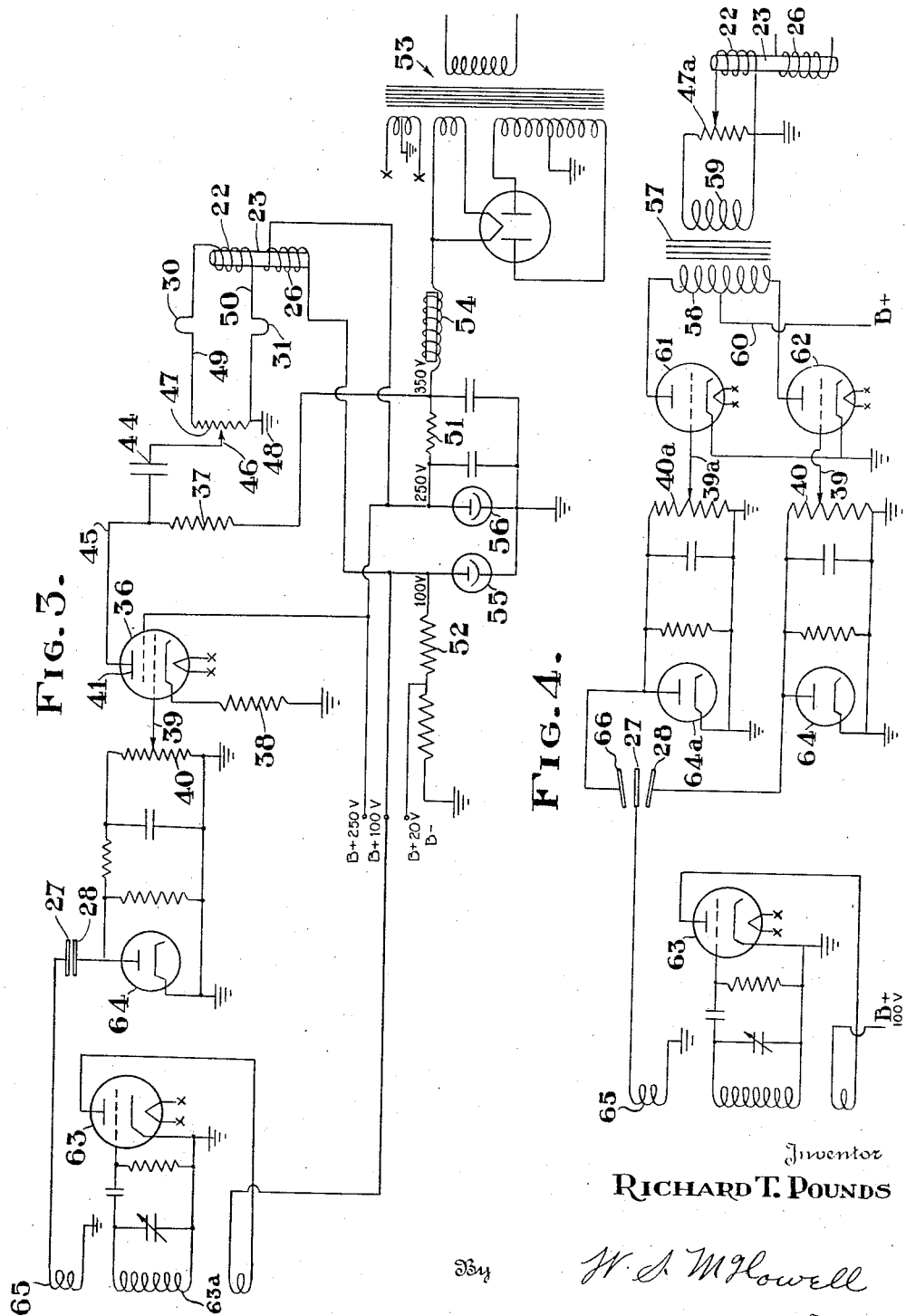

Patented Jan. 2, 1945

2,366,286

UNITED STATES PATENT OFFICE 2,366,286

ELECTRICAL DAMPING APPARATUS FOR WEIGHING SCALES

Richard T. Pounds, Columbus, Ohio, assignor to The Exact Weight Scale Company, Columbus, Ohio, a corporation of Ohio Application July 16, 1941, Serial No. 402,593

11 Claims. (Cl. 188—104)

This invention relates to weighing scales, having particular reference to improved and novel means for damping the oscillations of a scale lever and other scale parts associated therewith, in order to accelerate the bringing of the scale to equilibrium when commodities are applied to or removed from the weight receiver of such a scale. In damping such scale lever oscillations, it is customary to employ a mechanism known as a dashpot. Typically, this device comprises a fluid-containing cylinder in which is slidably arranged a piston, the latter being connected to one of the elements of the scale movable in response to weight applications, usually the beam or lever. Oscillation of the movable scale element in such dashpot constructions causes controlled movement of the piston against fluid resistance, which is of such order as to bring the oscillatory parts of the scale in an accelerated manner to normal positions of equilibrium or rest. Dashpots of this nature, containing oil as the displacement fluid, are open to certain objections which the present invention seeks to overcome, among which are the variations occasioned in the operating characteristics of such dashpots as the result of temperature changes, which affect the viscosity of the oil or other fluid employed in the dashpot, the tendency of the oil to vaporize or otherwise lose volume, as by spilling, when the scale is being transported or moved, and, often, the objectionable odors present around the scale incident to vaporization of the oil.

The present invention has for its primary object the provision of an electrically actuated means for damping scale lever oscillation, said means being of such character as to eliminate physical or frictional contact between relatively movable parts of the scale mechanism, and thereby relieve the scale of error attributable to such contact.

Another object of the invention resides in the provision of an electrical damper for weighing scales, wherein the scale lever is provided with a movable electrically energized coil, arranged in mechanically spaced relationship from a correspondingly energized stationarily supported pole piece, the means for energizing said coil and pole piece being such that when the scale lever is moved from its normal position, opposing magnetic fields are created by which motion of the lever is resisted.

With these and other objects in view, the invention consists of the novel features of construction, combinations of elements, and arrangements of parts, hereinafter more fully described and pointed out in the appended claims.

In the accompanying drawings:

Fig. 1 is a vertical sectional view taken through a weighing scale of the even balance type and disclosing the application of the improved electrical damper thereto;

Fig. 2 is an enlarged detail view disclosing in vertical section the movable coil carried by the scale lever and the associated stationary pole piece;

Fig. 3 is a diagrammatic view illustrating the circuits employed by the present invention;

Fig. 4 is a similar view disclosing a modified circuit arrangement.

Referring more particularly to the drawings, there has been disclosed in Fig. 1 a weighing scale of the even balance type. A scale of this type has been shown for convenience in illustration and is one example of a weighing scale to which the present invention is applicable. It will be understood, however, that the improvements forming the present invention are adaptable to other types of weighing scales wherein a movable lever is employed. In the specific embodiment of the scale illustrated, the numeral 1 designates the base of a casing 2 in which the movable parts of the scale mechanism may be housed. Arising from the base 1 is a centrally disposed support 3, in the upper portions of which are mounted bearing blocks 4, which receive the knife edge trunnions 5 which project rigidly from the center of the scale lever or beam 6.

One end of the lever 6 carries knife edge trunnions 7, inverted with respect to the trunnions 5. The trunnions 7 engage with seats provided on bearing blocks 8 carried by the heads 9 of a commodity receiver 10, the latter being disposed exteriorly of the casing 2. Similarly, at the opposite end of the lever 6, trunnions 11 are arranged for engagement with bearing blocks 12 carried by the head 13 of a known weight receiver 14. This receiver may be disposed within the confines of the casing 2 and rendered accessible by hinged cover 15, forming a part of the top of the casing 2. The heads 9 and 13 are provided with depending stems 16 which, at their lower ends, are pivoted to the opposite ends of a check link 17, the latter, in turn, being pivoted in its center as at 18 to the support 3 below and in alignment with the lever trunnions 5, producing the parallelogram or weighing figure of the scale.

Arising from the top of the casing 2 is a tower 19, in which may be arranged an indicator 20 of the type disclosed in the prior co-pending application, Serial No. 387,285, filed jointly by Thomas B. Flanagan and Richard T. Pounds, April 7, 1941, and now Patent No. 2,323,023, dated June 29, 1943. In this regard, however, any suitable type of indicator may be used, either mechanically or electrically operated, for denoting when the lever of the scale is occupying a normal position of balance, or the extent of its deflection from such position.

At one end, there is mechanically carried by the lever 6 a spool 21 in which are mounted the windings of a movable electrically energized coil 22. Extending through the coil 22 is a metallic pole piece 23, the latter being stationarily mounted on a support 24 arising from the base 1. Also, arranged around the bottom of the pole piece 23 and fixed thereto is a spool 25 carrying the windings of a stationary coil 26 employed in energizing the pole piece and creating magnetic flux therein. It will be noted that the spool 21 of the movable coil 22 is mechanically spaced from the pole piece 23 so that no mechanical friction is set up when the lever is oscillated from its normal position.

Also carried by one end of the lever 6 is a plate 27 of an electro-inductive means such as a variable condenser, the stationary plate of said condenser being indicated at 28, the latter being arranged on top of a post 29 supported upon the base 1.

The lever 6 may be positively maintained in a normal position when equal weights are carried by the opposite ends thereof, or when unweighted, by the provision of a pair of flex members 30 and 31. These members, preferably, are formed from lightweight spring steel bent to assume a U form. The opposite ends of each of these flex members are clamped as at 32 to the under side of the lever 6 on opposite sides of its fulcrums 5 and, also, similarly clamped as at 33 to frame pieces 34, stationarily arising from the base 1. Plates 33' may be inserted between the ends of the flex members 30 and 31 to insulate the latter from adjoining metallic parts.

Supported within the casing 2 is a receptacle shown at 35 in Fig. 1 which is adapted to receive electrical apparatus, depicted diagrammatically in Fig. 3, and which is used for controlling the energizing of the coils 22 and 26 when oscillatory motion is imparted to the lever 6, and thereby dampen or arrest such oscillatory movement.

While this result may be accomplished with a variety of different circuits and apparatus arrangements, it has been found that the apparatus and circuits illustrated in Fig. 3 are entirely satisfactory in attaining the ends of the present invention, although it will be appreciated that the same are subject to numerous variations or modifications.

Referring more particularly to Fig. 3, a vacuum electronic tube, for example, the commercially known 6L6 type, has been indicated at 36. The anode current of the tube traverses a load resistance indicated at 37, which resistance may be of the order of 5000 ohms. Minimum grid bias is supplied to the tube 36 by the IR drop through the resistance indicated at 38, the amount of anode current supplied by said tube being controlled by a variable source of D. C. current bias voltage, hereinafter more fully described, which is regulated by means dependent upon the movement of the scale lever from its normal position, and the setting of the variable arm 39 of the potentiometer disclosed at 40.

The anode 41 of the tube 36 is connected to one plate of a fixed condenser 44 by means of the lead shown at 45, the opposite plate of the fixed condenser being connected to the adjustable arm 46 of the potentiometer indicated at 47. One end of the potentiometer 47 is connected to a ground indicated at 48, while the other side of the potentiometer connects with the movable coil 22 through wire 49 and flex member 30. The other end of the coil 22 is joined with a conductor 50, in which is arranged the flex member 31, and leads back to the ground 48.

The damper field coil 26 is connected in series between the voltage divider resistances shown at 51 and 52, and serves the dual purpose of supplying the magnetic field for the pole piece 23 and as one section of the resistance network forming the voltage divider. A conventional rectifier is shown at 53, and its primary coil may be connected with a standard 110 volt A. C. source. This rectifier supplies on its secondary side approximately 350 volts D. C. to the voltage divider through the filter choke 54. Voltage regulator tubes 55 and 56 of the gas-filled current absorption type are used to maintain substantially constant the rated voltages specified across the voltage divider, irrespective of the normal variations of the power line and/or the current requirements of the electronic tube 36.

The source of variable D. C. bias voltage applied across the resistance or potentiometer 40 may be obtained in a number of ways, as will be hereinafter set forth. In order to describe the operation of the apparatus, it may be stated that the developed voltage across the resistance 40 is directly proportional to the position of the scale lever, that is, when the commodity platter end of the lever is sufficiently loaded to cause that end of the lever or beam to reach its stop, the developed voltage in the resistance 40 is at its minimum value; when this condition is reversed and the opposite end of the lever has traveled to its mechanical stop, the developed voltage is at its maximum. The potentiometer 40 serves as a means to adjust the maximum negative voltage applied to the control grid of the tube 36, so as to prevent its reaching such a value as to completely cut off the anode current of said tube 36.

The apparatus which I prefer for providing a variable bias voltage for the grid of tube 36 includes a conventional radio-frequency oscillator 63. A coil 65 is magnetically linked with the inductance 63a of the oscillator and the oscillator thereby supplies radio-frequency current to the circuit including the coil 65, the condenser 27, 28 and a diode rectifier 64. The latter is connected in a conventional circuit including inductance and capacitance arranged in the known manner to suppress ripples. As a result, the rectifier 64 delivers direct current through the resistor of potentiometer 40. The amount of the current input to the rectifier is controlled by the position of condenser plate 27 relative to plate 28, i. e., by the position of the scale lever 6. The output of the rectifier and consequently the bias potential applied to the grid of tube 39 are thus varied proportionally.

Due to the valve action of a vacuum tube and the variable D. C. voltage controlled by the scale lever movement, it is apparent that the anode current of the vacuum tube 36 is directly proportional to the operating positions of the lever 6.

The anode current of vacuum tube 36 must flow through the resistance 37 and thereby creates a voltage drop across this unit. The condenser 44, being connected to the anode side of the resistance 37 and its opposite plate returning to the ground 48, will become charged with a quantity of electrical energy, dependent upon the potential existing at the anode of the vacuum tube 36. For a given position of the scale lever, this charge remains constant and no current can flow through the circuit of the coil 22 as long as the IR drop across resistance 37 remains constant. However, if the scale lever is moved, the cumulative action above described changes the IR drop of the resistance 37 and the condenser 44 will immediately attempt to equalize its charge to the new value of the anode potential. Thus the condenser 44 will either charge or discharge, depending upon the new value of the anode potential as compared with the one previously established. Due to one plate of the condenser 44 returning to the ground 48, through potentiometer 47 and the coil 22, the charging or discharging current must flow through this circuit. The portion of current flowing through the coil 22 creates a magnetic field, and, due to its physical position with relation to the pole piece 23, will either be attracted to or repelled from said pole piece, depending upon the direction of the current flowing in coil 22.

In practice, these magnetic fields are arranged in such relationship that a force acting upon the scale lever causes the magnetic fields to apply a force in the opposite direction to that of lever travel. By the proper selection of the component units utilized in the apparatus, this opposing force may be made equal to, or even greater greater than, the initial force acting upon the lever. This condition apparently would cause the lever to lock. However, an initial force or movement is required to create the opposing force; therefore, the opposing force can only act to stop the initial force. As this condition approaches, there is no longer an opposing force and the lever is again free to move, whereupon the opposing force is again created. Thus the opposing force can never actually stop or lock the lever, but merely acts as a braking device, controlling the speed or extent of oscillation of the lever. The amount of braking action may be easily controlled by changing the setting of the variable arm of potentiometer 47, thus controlling the amount of current flowing through the coil 22.

It will be understood that while the drawing and description of this apparatus utilizes, in a preferred form of the invention, the combination of the resistance 37 and condenser 44 to produce the current flow through coil 22, these units may, in the modified form of the invention disclosed in Fig. 4, be replaced by a suitable transformer, indicated at 57. When using such a transformer, the operation is substantially the same as that above described, except that the current flow through the potentiometer, indicated at 47a and the coil 22 is caused by the increasing or decreasing flux, due to the current flow in the primary circuit 58, threading the turns of wire comprising the secondary circuit 59, that is, current flow in the secondary circuit exists only during the time the primary current is changing. Also, if desired, the primary circuit of the transformer 57 may be provided with a center tap 60. By employing two electronic tubes, indicated at 61 and 62, in place of the tube 36, with their anodes connected to the extreme ends of the primary side of the transformer 57 and with their positive direct current source connected to the center tap 60, an arrangement is provided wherein the variable D. C. source may be so designed that when the maximum voltage is applied to one control grid of one of the tubes 61 or 62, the other would receive its minimum voltage, and vice versa.

The variable D. C. voltage referred to may be supplied without adding any frictional elements to the scale, as shown in Fig. 3.

The high frequency oscillator 63 (approximately 450 k. c.) supplies radio-frequency current to the movable condenser plate 27 attached to the scale lever, the opposite plate 28 of this condenser being connected to the plate of the diode rectifier 64. Current flows in this circuit due to the induced voltage in the coil shown at 65, causing a D. C. voltage to appear in the potentiometer 40, the value of which is varied according to the capacitive reactance of condenser plates 27 and 28. Since this reactance varies with the spacing of said plates, movement of the scale lever controls the D. C. voltage present in the potentiometer 40. If the circuit arrangement shown in Fig. 4 is used, the scale condenser may include a second stationary plate 66 in opposing relation to the plate 28, providing a source of direct current, the maximum of which is at the opposite extreme of the lever movement.

When two stationary condenser plates are employed adjacent to the movable plate 27, as illustrated in Fig. 4, the second stationary plate, or the one above the plate 27, is connected to the plate of a second diode rectifier tube 64a arranged in a circuit similar to that in which the rectifier tube 64 is positioned. Current flows in both these circuits due to the induced voltage in the coil 65 and D. C. voltages will appear in the potentiometers 40 and 40a, the latter being arranged in the same circuit as the diode rectifier tube 64a. The values of the D. C. voltages will vary according to the capacitive reactance of condenser plates 27, 28 and 66, the value of the voltage in one circuit increasing while the other is decreasing and vice versa, depending upon the direction of movement of the scale beam. The variable arm 39a of the potentiometer 40a is connected with the grid of tube 61 in the same manner as the arm 39 is connected with the tube 62 to apply the D. C. voltages to these members. As in the form first described, the reactance varies with the spacing of the plates and, therefore, movement of the scale lever controls the D. C. voltages present in the potentiometers 40 and 40a.

The dual control just described is employed in scale installations wherein it is necessary to make use of a scale lever possessing considerable weight or one moving a comparatively long distance. In such installations, the form of damping mechanism first described might be insufficient and the latter would be more desirable since the dual control will make the damping mechanism more effective.

In view of the foregoing, it will be seen that the present invention provides apparatus for electrically damping the oscillation of a scale lever, eliminating the friction found in the conventional oil-plunger type of dashpot. It further provides a means for easily adjusting or regulating the damping action. The damping adjustment, obtained by the use of the potentiometer 47, may be located at any convenient point on the scale, or remotely therefrom, if desired. The damping means forming the present invention is not affected by temperature changes, fumes from evaporating oil are avoided and the spilling of oil precluded. Essentially, the apparatus is simple and comparatively inexpensive to produce.

What is claimed is:

1. In a weighing scale, a pivotally mounted lever of the even balance type, means for damping the oscillating motion of the lever developed by the application of weights to and the removal of the latter from said lever, said means comprising a member stationarily supported with respect to said lever, circuit means for establishing a localized magnetic field about said member, a second circuit including a coil, the latter being movable in unison with said lever to pass through said magnetic field, a condenser having a fixed plate and a movable plate, said movable plate being responsive to the movement of the lever from its normal position to vary the spacing between said plates, and electro-responsive means actuated by the movement of said lever from its normal position and the resultant variation in spacing of said condenser plates to energize said second circuit and the movable coil contained therein.

2. In a weighing scale, a pivotally mounted lever of the even balance type, means for damping oscillating motion of said lever including a member stationarily supported with respect to said lever, circuit means for establishing a localized magnetic field around said member, a second circuit including a coil, the latter being movable in unison with said lever to pass through said magnetic field, a fixed condenser in said second circuit, a variable condenser having a fixed plate and a movable plate, said movable plate being carried by said lever, and a third electrical circuit in which said variable condenser is positioned, said third circuit serving to energize said second circuit and the coil contained therein when the normal spacing of the plates of the variable condenser is changed by the movement of said lever from its normal position.

3. In a weighing scale, an oscillatory lever, electrically actuated means for damping the oscillation of said lever including means for creating a localized electrical field adjacent to one end of said lever, a circuit including a coil, the latter being movable with said lever in said field, and a variable condenser actuated by the movement of said lever for energizing said coil circuit following movement of the lever from its normal position.

4. In a weighing scale, a pivotally mounted lever of the even balance type, electrically actuated means for damping the oscillations of said lever comprising a pole piece stationarily supported adjacent to said lever, means for creating a localized electric field about said pole piece, a normally deenergized coil movable through the field of said pole piece in unison with the movements of said lever, and means for energizing said coil following movement of said lever from its normal position of balance.

5. In a weighing scale, an oscillatory lever, electrically operated means for damping the oscillations of said lever from a normal position, said means comprising a normally energized field establishing pole member stationarily supported with respect to said member, a normally deenergized field-creating member movable in unison with said lever in the field of said pole member, and means for energizing said movable member following movement of said lever from its normal position.

6. Apparatus for damping the movements of an oscillating member comprising an electromagnetic damper cooperating with said member and adapted to be energized variably in accordance with the movement of said member, and means for energizing said damper including a thermionic valve, means whereby the damper is energized in proportion to changes in the plate current through said valve, variable electro-inductive means actuated by movement of said members, and means whereby said electro-inductive means controls the charge on the grid of said valve.

7. Apparatus for damping the movements of an oscillating member comprising an electromagnetic damper cooperating with said member and adapted to be energized variably in accordance with the movement of said member, and means for energizing said damper including electro-inductive means actuated by said member, and current-control means responsive to movement of said electro-inductive means.

8. Apparatus for damping the movements of an oscillating member comprising an electromagnetic damper cooperating with said member and adapted to be energized variably in accordance with the movement of said member, and means whereby said damper is energized to exert a restraining force on said member proportional to the speed of movement thereof, said last-mentioned means including electro-inductive means actuated by said member and means responsive thereto for controlling the current through said damper.

9. Apparatus for damping the movements of an oscillating member comprising an electromagnetic damper cooperating with said member and adapted to be energized variably in accordance with the movement of said member, and means whereby said damper is energized to exert a restraining force on said member proportional to the speed of movement thereof, said last-mentioned means including electro-inductive means actuated by said member, a current-control device responsive thereto, and means responsive to changes in the current flowing through said current-control device for energizing said damper.

10. The combination with an oscillating member, of an electro-magnetic damping coil therefor, means external to the coil for supplying current thereto, and means actuated by said member affecting the current-supply means to vary the energization of said coil in accordance with the speed at which said member moves.

11. The combination with an oscillating member, of an electro-magnetic damping coil therefor, a current source connected to said coil, and means actuated by said member for controlling said source to vary the energization of said coil in accordance with the speed at which said member moves.

RICHARD T. POUNDS.